July 12, 1938.  G. H. WINGATE  2,123,682
OPTICAL APPLIANCE
Filed July 7, 1936
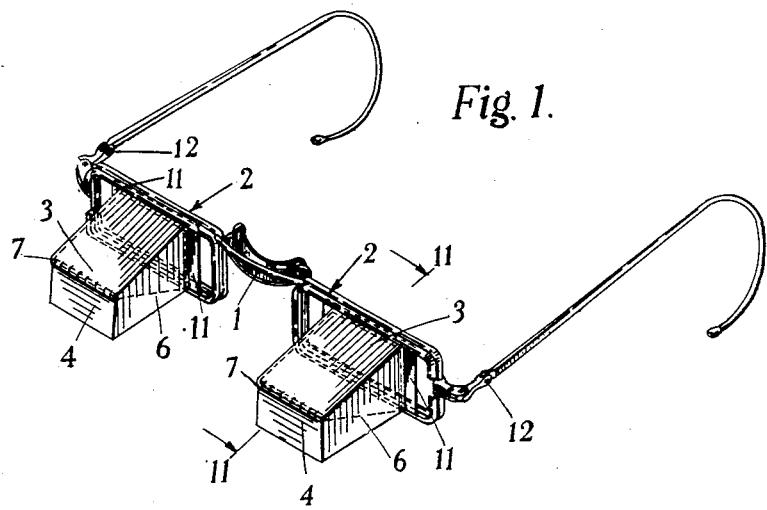
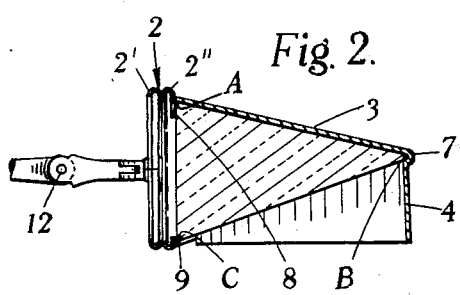
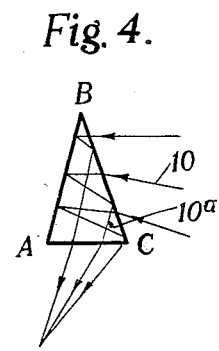
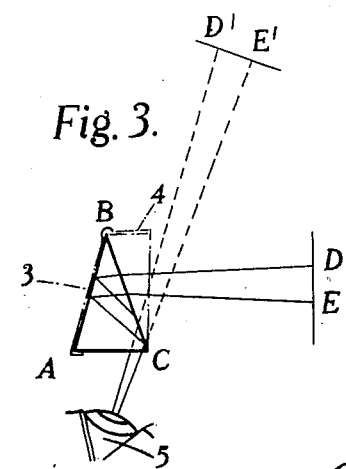
INVENTOR
Gerald H. Wingate
BY
ATTORNEY Patented July 12, 1938

2,123,682

UNITED STATES PATENT OFFICE 2,123,682

OPTICAL APPLIANCE

Gerald Henry Wingate, London, England

Application July 7, 1936, Serial No. 89,400
In Great Britain July 23, 1935

2 Claims. (Cl. 88—41)

This invention relates to optical appliances.

It is an object of the invention to provide an appliance which enables the wearer to view objects situated at a considerable angle to the direct line of vision whilst looking substantially in the direct line of vision. It is thus an object of the invention to provide an appliance which enables the wearer, when lying on his back, to view objects lying in a more or less horizontal direction without substantial downward movement of the eyes.

It is a further object of the invention to provide an appliance comprising a wearing frame carrying an optical device whereby rays of light proceeding from objects to be viewed are passed to the eye of the wearer by double reflection, one reflection occurring at the surface of a transparent member through which the rays enter the device.

It is a still further object of the invention to provide an appliance comprising a wearing frame carrying a prism having a mirrored side arranged to reflect rays from objects to be viewed back on to the side of the prism through which they entered, at such angles that they are internally reflected to the eye of the wearer.

With these and other objects in view, the invention consists in the improved combinations and arrangements contained in the embodiments now to be described in detail, the novel features of which are set out in the claims which follow.

In the drawing:

Figure 1 is a perspective view of the appliance,

Figure 2 is a section on the line II of Figure 1,

Figure 3 is a diagrammatic side elevation of part of the appliance in the position of normal use, and Figure 4 is a similar elevation of a prism showing the passage of rays of light through it when a certain condition is fulfilled.

The appliance comprises a frame 1 having a pair of rectangular eye-frames 2 each of which carries a triangular prism, the angles of which are, 35°, 70° and 75° respectively; the largest angle CAB of the prism is arranged uppermost (the spectacles being situated with their shafts horizontal as in Figure 2) and the smallest angle ABC is situated in front of the frame.

The side face AB of each prism, namely that which subtends the angle of 70°, is silvered and a black metal box or shield is provided having a portion 3 covering this side, portions 6 covering the two end faces, or bases, of the prism and a portion 4 extending downwardly in front.

The portion 4 of the shield is bulged forwardly, as indicated at 7, to receive the apex B of the prism, the prism being retained within the shield by means of tabs 8 and 9 formed integrally with the portions 3 and 6 thereof respectively.

As shown, each eye frame 2 is so formed as to provide grooves 2' and 2''. The grooves 2' may serve for the reception of correcting lenses, for example, whilst the grooves 2'' receive lugs 11 formed integrally with the portions 6 of the shields and bent at right angles thereto. This arrangement provides an adjustable mounting of the prisms which may be adjusted by lateral sliding movements to suit users whose pupils are situated at different distances apart to provide maximum field for each such user.

In the use for which the spectacles are normally intended, the user lies in the completely supine position with the eyes directed normally to the face, that is in the direction of the ceiling and sees objects in the room in front of him and reads matter held on, or at any rate substantially normal to, the chest.

Figure 3 shows approximately the position of the prisms when being worn by a person in the supine position.

Rays from the object DE entering the prism through the side face BC are refracted and pass to the silvered side AB, by which they are reflected. The reflected rays again strike the side through which they entered, this time from the inside and at such an angle that they undergo total internal reflection and pass out through the third, or smallest side AC when they are refracted and pass to the eye, indicated at 5.

An erect, equal sized image is produced at D'E' with an elevation of about 70°, which is a convenient angle, the downward movement of the eyes being no greater than in normal reading.

Tilting of the prism in planes normal to the pupils of the user's eyes does not affect the direction of the image, but has the effect of increasing or decreasing the extent of the effective field in planes normal to the user's chest, and some selection of field with relation to the user's pupils can be made in this way. Adjustable hinges, (shown at 12 in Figs. 1 and 2 and known in the trade as angling joints, i. e. joints which allow the frame to be tilted) may be provided, for example, whereby the eye-frames may be adjusted relatively to the shafts.

Maximum field is obtained when the visual axis for a central point passes within the prism to the smallest side face AC, after total internal reflection, in a direction parallel to the silvered surface AB. The passage of rays of light through a prism when this condition is satisfied is illustrated diagrammatically in Fig. 4, in which the portion 10a of the central ray 10 passes parallel to the side AB of the prism.

The front portions 4 of the shields cut off unwanted light coming from the direction of the ceiling and prevent such light entering the prisms at the small angles thereof. The portions 3 of the shields which cover the silvered sides protect the silvering and the portions 6 which cover the bases, or end faces, of the prisms, prevent the entry of light there.

I claim:

1. An appliance for diverting the direct-vision field of a recumbent wearer to permit normally direct vision of objects at a considerable angle to that field, comprising a spectacle frame having grooved eye-frames, a pair of unequal sided triangular prisms, an opaque shield for each prism arranged to cover the side of intermediate size and the two bases thereof, means for securing said prisms each to its shield, and members carried by said shields and engaging said grooved eye-frames.

2. An appliance for diverting the direct-vision field of a recumbent wearer to permit normally direct vision of objects at a considerable angle to that field, comprising a wearing frame, a grooved eye-frame, a four sided shield, lugs formed on two sides of said shield and engaging said grooved eye-frame and a prism carried by said shield.

GERALD HENRY WINGATE.